3,819,783
PROCESS FOR EMBOSSING A THERMOPLASTIC LAYER BY SELECTIVE EXPANSION
Peter William Jones, Loughborough, England, assignor to Fisons Limited, London, England
Filed June 8, 1971, Ser. No. 151,137
Claims priority, application Great Britain, June 11, 1970, 28,434/70
Int. Cl. B29d 7/22, 27/04; B41m 7/00
U.S. Cl. 264—52                6 Claims

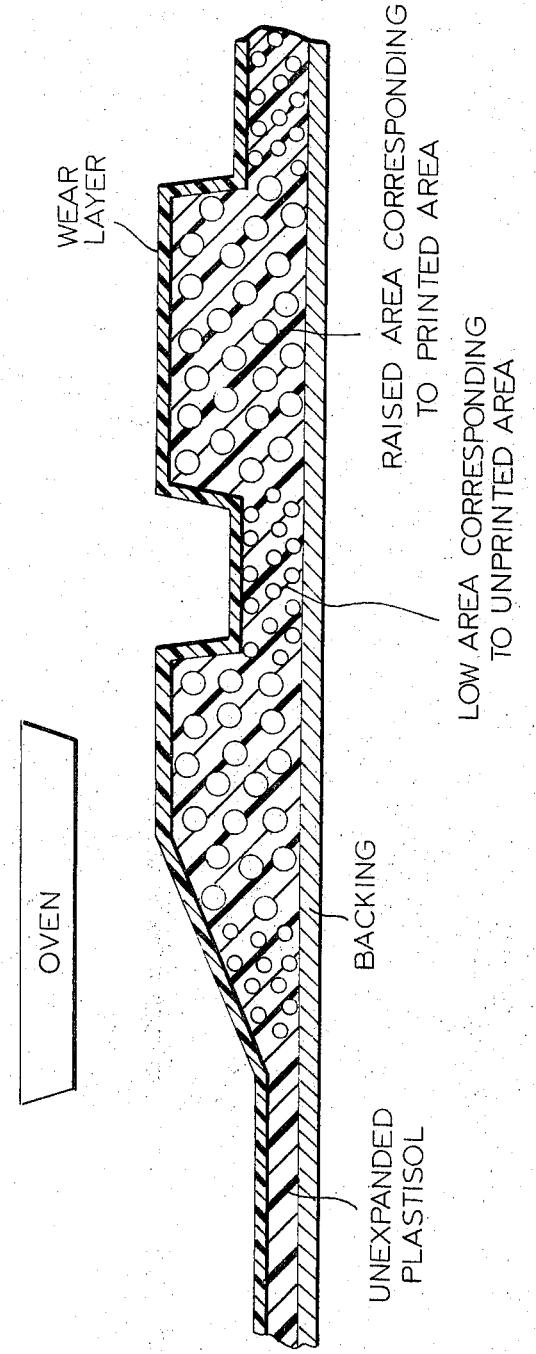

ABSTRACT OF THE DISCLOSURE

Materials having an embossed surface are formed by printing a layer containing a thermoplastic polymer, a blowing agent and a tin compound, with a printing ink containing an activator for the blowing agent, and heating the layer to cause the blowing agent in the printed areas to decompose to a greater degree than the blowing agent in the unprinted areas.

---

The present invention relates to a process for the manufacture of expanded thermoplastic materials.

U.K. Specification 1,147,983 describes and claims a process for embossing by selective expansion of a thermoplastic polymeric material which comprises forming into sheet form an expandable mix containing a thermoplastic polymeric material and a blowing agent, applying to selected areas of the surface of the sheet a composition containing a kicker for the blowing agent, and heating the sheet to a temperature and for a time such that in those areas of the sheet in contact with the kicker composition, the blowing agent is decomposed to a greater degree than in the remaining areas and the sheet is thereby differentially expanded. It has now surprisingly been found that particularly good results are obtained if the expandable mix also contains a tin compound. In addition, it has been found that the tin compounds generally have a lower toxicity than the barrium or cadmium stabilisers conventionally used, and thus are more suitable for the many instances where toxicity is an important factor to be considered.

Accordingly, the present invention provides a process for embossing by selective expansion a thermoplastic polymeric material which comprises forming into sheet form an expanadable mix containing a thermoplastic polymeric material, a blowing agent, and at least one tin compound, applying to selected areas of the surface of the sheet an activator ink containing a kicker for the blowing agent, and heating the sheet to a temperature and for a time such that in those areas of the sheet in contact with the kicker composition, the blowing agent is decomposed to a greater degree than in the remaining areas and the sheet is thereby differentially expanded. In this process the time and temperature of the final heating stage are inter-related.

FIG. 2 is a cross sectional view of the differentially expanded material produced in accordance with the present invention.

Figure 1:
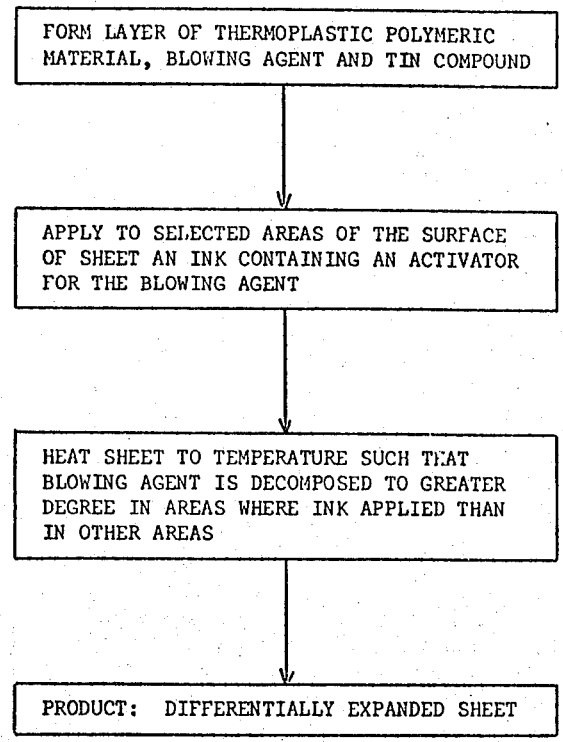
FIG. 1 is a flow sheet of the above described process.

The process described is of special application in the manufacture of flooring, wall and ceiling covering materials. For flooring materials, heavy grade materials are obviously required, and the flooring material is usually made of a textile base laminated to the main supporting plastic sheet which may be expanded or non-expanded and to which is laminated the surface sheet, which is differentially expanded to produce the decorative wear surface. For the wall and ceiling covering materials, which may be considered as wallpapers, these may comprise a paper or fabric base on to which is spread or laminated the surface sheet, which is differentially expanded to produce the desired decorative surface.

The differentially expanded sheet is prepared by the interaction of the sheet formed from the expandable mix, and the composition containing the kicker hereinafter referred to for convenience as the "activator ink."

The thermoplastic polymeric material may be a condensation polymer such as a polyamide (for example polycaprolactam or polyaminoundecanoic acid), or a polyester (for example terephthalate polyesters). The thermoplastic polymeric material may also be an addition polymer such as a polyolefin (for example polyethylene or polypropylene), a polyacrylate (for example polymethylmethacrylate), a polystyrene or a polymerisation product of a halogen substituted olefin such as polyvinyl chloride.

The blowing agent may be any of the conventional blowing agents, the decomposition temperature of which is lowered in the presence of a variety of compounds known as kickers. It is, however, essential to select a blowing agent appropriate to the polymer being used; that is the blowing agent must decompose in the presence of a kicker at a temperature at which the polymer or a composition containing it is in a condition to be expanded. Examples of blowing agents include azodicarbonamide, barium azodicarboxylate, pp¹-oxybis (benzene sulphonyl hydrazide) and pp¹-oxybis (benzene sulphonyl semicarbazide). Preferably the blowing agent is azodicarbonamide.

According to a preferred embodiment of the invention there is provided a process for embossing by selective expansion of a thermoplastic polymeric material which comprises forming into sheet form an expandable mix containing a polymer or copolymer derived from vinyl chloride, azodicarbonamide as a blowing agent, and a tin compound, applying to selected areas of the surface of the sheet a composition containing a kicker for the azodicarbonamide and heating the sheet to a temperature and for a time such that in those areas of the sheet in contact with the kicker composition, the blowing agent is decomposed to a greater degree than in the remaining areas and the sheet is thereby differentially expanded.

The polymer or copolymer derived from vinyl chloride may be polyvinyl chloride, a copolymer of vinyl chloride with the vinyl esters of fatty acids (such as vinyl acetate) or with other polymerisable vinyl-containing monomers (such as vinylidene chloride, acrylic acid and styrene).

The particle size of the azodicarbonamide is important in obtaining optimum differential expansion between the activated and unactivated areas of the sheet of the expandable mix. Preferably the azodicarbonamide has a surface in the range 4,000 to 6,000 square centimetres per gram, the particle size range lying between 3 and 15 microns. The amount of azodicarbonamide is preferably 1–10% by weight based on the weight of the polymer containing units derived from vinyl chloride.

A wide range of tin compounds may be used in the present invention, but particularly preferred are those tin compounds which are conventionally used as stabilisers for polymeric materials. Examples of suitable tin compounds include dialkyl tin maleates, for example, di-lower alkyl tin maleates, such as di-butyl tin maleate, dialkyl tin laurates, for example di-lower alkyl tin laurates, thio-tin compounds, tin mercaptides and the like.

The concentration of the tin compound in the plastisol may vary over a wide range but is preferably from 0.2 to 5 parts per 100 parts by weight of polymer.

The expandable mix may also contain other ingredients suitable for obtaining a desirable product. These additional ingredients include plasticizers, solvents, diluents, extenders, dyes, hardeners and other stabilisers.

The kicker used in the activator ink may be any of a number of compounds which lower the decomposition temperature of the blowing agent including compounds of zinc (such as zinc oxide, zinc octoate, zinc nitrate and zinc fatty acid soaps), compounds of cadmium (such as cadmium octoate, cadmium caproate, cadmium laurate, cadmium myristate and cadmium fatty acid soaps), compounds of lead (such as lead carbonate, lead phthalate, lead phosphite and lead stearate), urea, borax, ethanolamine, glycols and other chemical blowing agents such as benzene sulphonhydrazine. Preferably, however, the kicker is a zinc compound such as zinc octoate or zinc nitrate.

The activator ink, consists essentially of a mixture of a solution or dispersion of the kicker and a solution or dispersion of a film former or binder resin and a dye or pigment. The dispersant for the kicker is preferably an ester such as ethyl acetate. Suitable film formers or binder resins include polyvinyl chloride or a copolymer of vinyl chloride and vinyl acetate, acrylic resins, polyurethanes, cellulose acetate, polyesters, polystyrenes, rubbers, epoxy resins, silicones and other polymers. Solvents or dispersants for the film former or binder are preferably those which act as a dispersant for the polymer of copolymer derived from vinyl chloride used in the expandable mix since in this way improved migration of kicker is obtained from the activator ink into the sheet of expandable mix. Suitable solvents include ketones such as tetrahydrofuran, cyclohexanone, methyl ethyl ketone and methyl isobutyl ketone, esters such as ethyl acetate, chlorinated hydrocarbons such as ethylene dichloride and methylene chloride and nitro compounds such as nitro benzene and nitropropane. In order to "offset" the volatility of the solvents in the activator ink which is undesirable in printing operations a diluent may be used, suitable diluents including hydrocarbons such as toluene and xylene.

The activator ink desirably contains 2% to 25% by weight of the kicker and preferably contains 5% to 20% by weight of the kicker. The consistency of the activator ink is important if optimum results are to be obtained. The solids content of the ink is suitably of the order of 5–30% solids by weight of the ink.

The expandable mix is preferably made as a plastisol. Suitable plasticizers for making the plastisol include esters of phthalic acid (such as butyl benzyl phthalate, dioctyl phthalate, dialphanyl phthalate and diisooctyl phthalate) esters of adipic acid (such as di-octyl adipate), esters of sebacic acid (such as di-octyl sebacate), and phosphoric acid esters (such as tricresyl phosphate and octyl diphenyl phosphate).

The amounts of plasticizers and fillers present in the expandable mix may vary over a wide range. The amount of plasticiser may comprise for example 40 to 100 parts by weight per 100 parts by weight of polymer. Preferably the amount of plasticizer is in the range 50–80 parts by weight per 100 parts by weight of polymer. The amount of filller may comprise for example 1–50 parts by weight per 100 parts by weight of resin—the higher proportions of filler are preferred, since these also permit the easier penetration of the activator ink.

The plastisol may incorporate other suitable stabilizers to reduce degradation of the polymer by heat and light. Preferably the plastisol contains a total concentration of the other stabilizers and the tin compound of from 0.5 to 10 parts by weight per 100 parts by weight polymer.

The plastisol may also incorporate dyes or pigments, diluents such as hydrocarbons for example toluene, fillers and the like.

The amount of blowing agent in the plastisol will vary according to the degree of expansion required. Suitably 1 to 20 parts by weight of blowing agent will be used for every 100 parts by weight of polymer. Preferably this proportion is in the range 2 to 10 parts by weight of blowing agent, e.g. azodicarbonamide, for every 100 parts by weight of polymer.

The expandable mix may be formed into a sheet by extruding, casting, calendering or spreading the mix. Preferably the expandable mix is spread as a plastisol on to a suitable surface, which may or may not provide a permanent backing, and the plastisol is gelled; that is the plastisol is heated for a period of time sufficient for the plastisol layer to assume a solid tack-free state but insufficient to decompose the blowing agent.

The degree of gellation of the expandable mix at the time of the application of the activator ink is important if the desired effect is to be obtained. In order to print the surface of the sheet by conventional means the physical condition of the sheet must be such that adhesion to the printing rollers does not occur. However, if the sheet of the expandable mix is gelled to too great an extent the desired effect is not obtained. For optimum results the sheet of the expandable mix should be gelled to the minimum extent which will permit printing. Preferably the sheet is gelled at a temperature in the range 100° C. to 150° C. for a period of time in the range 2.5 minutes to 0.5 minutes. Desirably the higher the temperature of gellation the lower is the time of gellation.

The backing may be formed of a resinous material, a woven fabric, impregnated felted fibre or a release material such as paper coated for example with silicone, alginate or casein compositions.

The activator ink is preferably applied to the gelled plastisol by any of the conventional printing techniques. Desirably before any further steps are taken in the process the gelled plastisol with its printed design is allowed to stand for a period of time for example from 1 to 24 hours. The precise length of time will depend on the degree of differential expansion required, the differential increasing as the length of time increases.

If desired, a wear surface may be provided on the embossed surface. This may be achieved by applying to the printed and gelled plastisol a layer of a thermoplastic polymeric material which preferably does not contain a blowing agent.

The printed and gelled plastisol may be heated in a number of ways for example in hot air ovens or by infra red heaters. The temperature to which the printed and gelled plastisol is heated is above the decomposition temperature of the kicked blowing agent, and is preferably in the range 150° C.–210° C. The time for which the printed and gelled plastisol is heated depends on the temperature and the degree of decomposition of the blowing agent required but is preferably in the range 15–300 seconds.

The following example, in which all parts are by weight, is given to illustrate the invention.

EXAMPLE

A polyvinyl plastisol comprising:

| | Parts |
|---|---|
| Polyvinyl chloride (Geon 121) | 100 |
| Di-octyl phthalate | 65 |
| Di-octyl adipate | 10 |
| Epoxydised soya oil | 5 |
| Genitron AC.3 (Azodicarbonamide) | 3 |
| Filler | 35 |
| Di-butyl tin maleate (Advastab OM.18) | 1.5 | was spread in the usual manner onto fabric or release paper to form a layer 0.4 mm. thick. The layer was gelled at 140° C. for 15 seconds.

The gelled layer was printed by standard rotogravure printing equipment with an ink comprising:

| | Parts |
|---|---|
| Plexigum M.334 (acrylic copolymer) | 2 |
| Plexigum M.345 (acrylic copolymer) | 2 |
| Toluene | 1.3 |
| Methyl ethyl ketone | 16.875 |
| Methyl isobutyl ketone | 12.5 |
| Microlith pigment | 4 |
| Zinc octoate [1] | 3.575 |
| Ethyl acetate [1] | 3.575 |

[1] Supplied as "Activator Concentrate."

The printed layer was then coated with an 0.1 mm. thick layer which comprised:

| | Parts |
|---|---|
| Polyvinylchloride (Geon 121) | 100 |
| Di-octyl phthalate | 45 |
| Di-octyl adipate | 10 |
| Ba/Cd stabiliser | 1.5 |
| Deplastol (a viscosity depressant) | 1.5 |

The material was then expanded by heating at 200° C. for 2 minutes. After expansion the material was measured and found to be 0.79 mm. thick in the unprinted areas, and 1.88 mm. thick in the printed areas, showing a difference of 1.09 mm. in thickness within the layer.

I claim:

1. In a process for embossing a thermoplastic polymeric material by selective expansion which comprises forming into a layer an expandable plastisol containing a thermoplastic polymeric material and a chemical blowing agent, applying to selected areas of the surface of the layer an activator ink containing a kicker for the blowing agent, and heating the sheet to a temperature and for a time such that in those areas of the sheet in contact with the kicker composition, the blowing agent is decomposed to a greater degree than in the remaining areas and the sheet is thereby differentially expanded, the improvement wherein a tin compound selected from dialkyl tin maleates, dialkyl tin phthalates, thio-tin compounds and tin mercaptides is incorporated into the expandable plastisol.

2. A process according to claim 1 wherein the tin compound is dibutyl tin maleate.

3. A process according to claim 1 wherein the tin compound is present as 0.2 to 5 parts by weight per 100 parts by weight polymer.

4. In a process for embossing a thermoplastic polymeric material by selective expansion which comprises forming into a layer an expandable plastisol containing a vinyl chloride polymer and azodicarbonamide, applying to selected areas of the surface of the layer a composition containing a kicker for the azodicarbonamide and heating the sheet to a temperature and for a time such that in those areas of the sheet in contact with the kicker composition, the blowing agent is decomposed to a great degree than in the remaining areas and the sheet is thereby differentially expanded, the improvement wherein a tin compound selected from dialkyl tin maleates, dialkyl tin laurates, thio-tin compounds and tin mercaptides is incorporated into the expandable plastisol.

5. A process according to claim 4 wherein the tin compound is dibutyl tin maleate.

6. A process according to claim 4, wherein the tin compound is present as 0.2 to 5 parts per 100 parts of weight polymer.

References Cited
UNITED STATES PATENTS

| | | | |
|---|---|---|---|
| 3,464,934 | 9/1969 | Birkett et al. | 264—52 X |
| 3,293,094 | 12/1966 | Nairn et al. | 264—52 X |
| 3,373,072 | 3/1968 | Jones | 264—52 X |
| 3,453,171 | 7/1969 | Crowley | 264—52 X |
| 3,365,353 | 1/1968 | Witman | 264—52 X |
| 3,458,337 | 7/1969 | Rugg | 264—52 UX |

PHILIP E. ANDERSON, Primary Examiner

U.S. Cl. X.R.

260—2.5 P; 264—45, 54, 132, DIG. 60